(12) United States Patent
Baker et al.

(10) Patent No.: US 8,976,799 B1
(45) Date of Patent: Mar. 10, 2015

(54) CONVERGED COMPUTER I/O SYSTEM AND BRIDGING MECHANISM FOR PEER-TO-PEER COMMUNICATION

(75) Inventors: Paul A. Baker, Los Altos, CA (US); Michael W. Murphy, Menlo Park, CA (US); Eric Werner Anderson, Cupertino, CA (US); Colin Whitby-Strevens, Ben Lomond, CA (US); David Ferguson, Sunnyvale, CA (US); Keith Diefendorff, Los Gatos, CA (US); Ron Hochsprung, Los Gatos, CA (US); William Cornelius, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/239,742

(22) Filed: Sep. 27, 2008

Related U.S. Application Data

(60) Provisional application No. 60/997,248, filed on Oct. 1, 2007.

(51) Int. Cl.
*H04L 12/28* (2006.01)
*G06F 15/16* (2006.01)
*H04L 29/06* (2006.01)

(52) U.S. Cl.
CPC ........................................ *H04L 29/06* (2013.01)
USPC ........................................... 370/401; 709/236

(58) Field of Classification Search
USPC ............................... 370/392, 401, 249; 710/72
See application file for complete search history.

(56) References Cited

U.S. PATENT DOCUMENTS

| | | | |
|---|---|---|---|
| 3,581,143 A | 5/1971 | Dornfeld | |
| 4,628,151 A | 12/1986 | Cardas | |
| 5,228,035 A * | 7/1993 | Hirato et al. | 370/446 |
| 5,313,465 A | 5/1994 | Perlman et al. | |
| 5,711,686 A | 1/1998 | O'Sullivan et al. | |
| 6,029,137 A | 2/2000 | Cordery et al. | |
| 6,169,251 B1 | 1/2001 | Grant et al. | |
| 6,485,335 B1 | 11/2002 | Dewdney | |
| 6,495,763 B1 | 12/2002 | Eichmann et al. | |
| 6,653,813 B2 | 11/2003 | Khatri | |
| 6,792,474 B1 | 9/2004 | Hopprich et al. | |

(Continued)

FOREIGN PATENT DOCUMENTS

| | | |
|---|---|---|
| EP | 1202419 A1 | 5/2002 |
| EP | 2090955 A1 | 8/2009 |

(Continued)

OTHER PUBLICATIONS

PCI Express TM Base Specification Revision 1.0a Apr. 15, 2003.*

(Continued)

*Primary Examiner* — Marsha D Banks Harold
*Assistant Examiner* — Christopher Wyllie
(74) *Attorney, Agent, or Firm* — Kilpatrick Townsend & Stockton LLP

(57) ABSTRACT

A high-speed I/O interface that allows a number of native I/O formats to be encapsulated into PCIe Vendor Defined Messages ("VDMs") for transfer over a single physical medium, preferably optical, and is thus referred to as the converged I/O ("CIO") interface. The devices can be designed to provide synchronization (time value, frequency, and phase) among a network of routers, with signal paths of several meters, thereby providing an accurate time base suitable for exacting audiovisual applications.

20 Claims, 8 Drawing Sheets

(56) References Cited

U.S. PATENT DOCUMENTS

| | | | |
|---|---|---|---|
| 6,798,790 B1* | 9/2004 | Enssle et al. | 370/503 |
| 6,998,538 B1 | 2/2006 | Fetterolf, Sr. et al. | |
| 7,033,219 B2 | 4/2006 | Gordon et al. | |
| 7,174,413 B2 | 2/2007 | Pettey et al. | |
| 7,188,209 B2 | 3/2007 | Pettey et al. | |
| 7,197,549 B1 | 3/2007 | Salama et al. | |
| 7,219,183 B2 | 5/2007 | Pettey et al. | |
| 7,255,602 B1 | 8/2007 | Driessen et al. | |
| 7,366,182 B2 | 4/2008 | O'Neill | |
| 7,369,388 B2 | 5/2008 | Cheung et al. | |
| 7,422,471 B1 | 9/2008 | Wu | |
| 7,447,922 B1 | 11/2008 | Asbury et al. | |
| 7,466,712 B2 | 12/2008 | Makishima et al. | |
| 7,480,303 B1* | 1/2009 | Ngai | 370/395.5 |
| 7,562,176 B2 | 7/2009 | Kloeppner et al. | |
| 7,587,575 B2 | 9/2009 | Moertl et al. | |
| 7,689,755 B2 | 3/2010 | Balasubramanian et al. | |
| 7,743,197 B2* | 6/2010 | Chavan et al. | 710/314 |
| 7,830,882 B2* | 11/2010 | Johnson | 370/392 |
| 7,860,205 B1* | 12/2010 | Aweya et al. | 375/376 |
| 8,312,302 B2 | 11/2012 | Baker et al. | |
| 8,327,536 B2 | 12/2012 | Kim et al. | |
| 8,380,912 B2 | 2/2013 | Jaramillo | |
| 8,463,881 B1* | 6/2013 | Baker et al. | 709/220 |
| 2002/0010799 A1 | 1/2002 | Kubota et al. | |
| 2002/0093935 A1* | 7/2002 | Denney et al. | 370/347 |
| 2003/0137997 A1* | 7/2003 | Keating | 370/519 |
| 2004/0080544 A1 | 4/2004 | Stripling | |
| 2004/0115988 A1 | 6/2004 | Wu | |
| 2005/0025119 A1* | 2/2005 | Pettey et al. | 370/351 |
| 2005/0060470 A1* | 3/2005 | Main et al. | 710/305 |
| 2005/0060480 A1* | 3/2005 | Solomon | 710/306 |
| 2005/0111362 A1* | 5/2005 | Freytsis et al. | 370/230 |
| 2005/0147119 A1* | 7/2005 | Tofano | 370/466 |
| 2005/0238035 A1* | 10/2005 | Riley | 370/401 |
| 2005/0262269 A1* | 11/2005 | Pike | 710/1 |
| 2006/0023386 A1 | 2/2006 | Palinkas et al. | |
| 2006/0029038 A1 | 2/2006 | Jungck | |
| 2006/0083518 A1 | 4/2006 | Lee et al. | |
| 2006/0092928 A1* | 5/2006 | Pike et al. | 370/355 |
| 2006/0168387 A1* | 7/2006 | Gan et al. | 710/305 |
| 2006/0200600 A1* | 9/2006 | Groso | 710/62 |
| 2006/0206655 A1* | 9/2006 | Chappell et al. | 710/315 |
| 2006/0288098 A1* | 12/2006 | Singh et al. | 709/224 |
| 2007/0011536 A1* | 1/2007 | Khanna et al. | 714/733 |
| 2007/0074891 A1 | 4/2007 | Burke | |
| 2007/0086487 A1* | 4/2007 | Yasuda et al. | 370/503 |
| 2007/0208899 A1* | 9/2007 | Freking et al. | 710/313 |
| 2007/0266179 A1* | 11/2007 | Chavan et al. | 709/250 |
| 2008/0065738 A1* | 3/2008 | Landers et al. | 709/217 |
| 2008/0079462 A1 | 4/2008 | Chiu et al. | |
| 2008/0091857 A1* | 4/2008 | McDaniel | 710/72 |
| 2008/0117909 A1* | 5/2008 | Johnson | 370/392 |
| 2008/0123672 A1* | 5/2008 | Wilkinson | 370/412 |
| 2008/0147898 A1 | 6/2008 | Freimuth et al. | |
| 2008/0195747 A1* | 8/2008 | Elmaliah | 709/232 |
| 2008/0222338 A1 | 9/2008 | Balasubramanian | |
| 2008/0250175 A1 | 10/2008 | Sheafor | |
| 2008/0279186 A1* | 11/2008 | Winter et al. | 370/392 |
| 2009/0003335 A1* | 1/2009 | Biran et al. | 370/389 |
| 2009/0003361 A1* | 1/2009 | Bakthavathsalam | 370/401 |
| 2009/0006710 A1* | 1/2009 | Daniel et al. | 710/315 |
| 2009/0016348 A1* | 1/2009 | Norden et al. | 370/392 |
| 2009/0022176 A1 | 1/2009 | Nguyen | |
| 2009/0037606 A1* | 2/2009 | Diab | 709/247 |
| 2009/0063701 A1* | 3/2009 | Bagepalli et al. | 709/238 |
| 2009/0070775 A1* | 3/2009 | Riley | 719/311 |
| 2009/0117754 A1 | 5/2009 | Fields et al. | |
| 2009/0182917 A1 | 7/2009 | Kim | |
| 2009/0222924 A1 | 9/2009 | Droz et al. | |
| 2010/0014598 A1 | 1/2010 | Pfeifer | |
| 2010/0046590 A1 | 2/2010 | Harper et al. | |
| 2010/0085091 A1 | 4/2010 | Strazzieri et al. | |
| 2010/0185792 A1 | 7/2010 | Yao et al. | |
| 2011/0278043 A1 | 11/2011 | Ueda et al. | |
| 2012/0000703 A1 | 1/2012 | Kim et al. | |
| 2012/0000705 A1 | 1/2012 | Cornelius et al. | |
| 2012/0005394 A1* | 1/2012 | Goodart et al. | 710/313 |
| 2012/0005496 A1 | 1/2012 | Baker et al. | |
| 2012/0103651 A1 | 5/2012 | Kim | |
| 2012/0104543 A1 | 5/2012 | Shahoian | |
| 2012/0106018 A1 | 5/2012 | Shahohian et al. | |
| 2012/0152613 A1 | 6/2012 | Kim et al. | |
| 2012/0215950 A1* | 8/2012 | Anderson | 710/33 |
| 2012/0233489 A1 | 9/2012 | Cornelius et al. | |

FOREIGN PATENT DOCUMENTS

| | | |
|---|---|---|
| JP | H08-265600 | 10/1996 |
| JP | 2001-109697 A | 4/2001 |
| JP | 2003-189263 A | 7/2003 |
| JP | 2005-521368 A | 7/2005 |
| JP | 2005-309744 A | 11/2005 |
| JP | 2006-048594 A | 2/2006 |
| JP | 2007-251779 A | 9/2007 |
| JP | 2008-252310 A | 10/2008 |
| JP | 2009-123561 A | 6/2009 |
| WO | 2006/102606 A2 | 9/2006 |
| WO | 2006/102606 A3 | 9/2006 |
| WO | WO 2007/099507 A2 | 9/2007 |
| WO | 2009/039287 A2 | 3/2009 |
| WO | 2009/039287 A3 | 3/2009 |
| WO | 2009/046617 A1 | 4/2009 |
| WO | 2009/086566 A1 | 7/2009 |
| WO | 2010/051281 A2 | 5/2010 |
| WO | 2010/051281 A3 | 5/2010 |
| WO | 2012/003347 A1 | 1/2012 |
| WO | 2012/003381 A2 | 1/2012 |
| WO | 2012/003385 A1 | 1/2012 |

OTHER PUBLICATIONS

Display Port, Wikipedia, the free encyclopedia, 4 pages; printed on Aug. 29, 2008 from http://en.wikipedia.org/wiki/Displayport; page states it was last modified on Aug. 25, 2008.

Dopplinger, A., et al. "Using IEEE 1588 for synchronization of network-connected devices", Mar. 29, 2007, from www.embedded.com/columns/technicalinsights/, 7 pages.

Ethernet, Wikipedia, the free encyclopedia, 9 pages; printed on Aug. 17, 2008, from http://en.wikipedia.org/wiki/Ethernet; page states it was last modified on Aug. 17, 2008.

IDT 24-Lane 3-Port PCI Express, 89HPES24N3 Data Sheet, Jul. 18, 2006, 30 pages.

IEEE 1394 interface, Wikipedia, the free encyclopedia, 7 pages; printed on Jul. 24, 2008 from http://en.wikipedia.org/wiki/Firewire; page states it was last modified on Jul. 23, 2008.

PCI Express, Wikipedia, the free encyclopedia, 11 pages; printed on Jul. 24, 2008 from http://en.wikipedia.org/wiki/PCI-Express; page states it was last modified on Jul. 16, 2008.

PCI Express Architecture, Chapter 3, Address Spaces & Transaction Routing, from PCIEX.book, pp. 105-152, Aug. 5, 2003.

PCI Express Base Specification Revision 1.0a, Apr. 15, 2003, pp. 1-426.

PCI-X, Wikipedia, the free encyclopedia, 4 pages; printed on Sep. 9, 2008 from http://en.wikipedia.org/wiki/PCI-X; page states it was last modified on Sep. 4, 2008.

Peer-to-peer, Wikipedia, the free encyclopedia, 11 pages; printed on Jul. 24, 2008 from http://en.wikipedia.org/wiki/Peer-to-peer; page states it was last modified on Jul. 24, 2008.

Peripheral Component Interconnect, Wikipedia, the free encyclopedia, 7 pages; printed on Jul. 24, 2008, from http://en.wikipedia.org/wiki/PCI_%28bus%29; page states it was last modified on Jul. 23, 2008.

Universal Serial Bus, Wikipedia, the free encyclopedia, 17 pages; printed on Jul. 24, 2008 from http://en.wikipedia.org/wiki/USB; page states it was last modified on Jul. 23, 2008.

VESA DisplayPort Standard, Version 1, Revision la, Jan. 11, 2008, 238 pages.

U.S. Appl. No. 12/239,743, filed Sep. 27, 2008, Baker et al.

(56) References Cited

OTHER PUBLICATIONS

International Preliminary Report on Patentability for PCT Application No. PCT/US2011/042689, mailed on Jan. 17, 2013, 7 pages.
Notice of Allowance for U.S. Appl. No. 12/239,743, mailed Feb. 19, 2013, 48 pages.
Final Office Action for U.S. Appl. No. 13/403,182, mailed Jun. 11, 2014, 13 pages.
Non-Final Office Action for U.S. Appl. No. 13/403,182, mailed Dec. 20, 2013, 14 pages.
Office Action for Japanese Patent Application No. 2012-543350, mailed on Dec. 28, 2012, in 4 pages.
Notice of Allowance mailed on Oct. 17, 2014, for U.S. Appl. No. 13/403,182, 7 pages.
International Search Report and Written Opinion for Application No. PCT/US2011/042634 mailed on Nov. 30, 2011, 20 pages.
International Search Report and Written Opinion for Application No. PCT/US2011/042684 mailed on Jan. 31, 2012, 18 pages.
International Search Report and Written Opinion for Application No. PCT/US2011/042689 mailed on Sep. 28, 2011, 23 pages.

* cited by examiner

CONVERGED COMPUTER I/O SYSTEM AND BRIDGING MECHANISM FOR PEER-TO-PEER COMMUNICATION

CROSS REFERENCE TO RELATED APPLICATIONS

This application claims the benefit of U.S. Patent Application No. 60/997,248 filed Oct. 1, 2007 for "Converged Computer I/O System and Bridging Mechanism for Peer-to-Peer Communication" (inventors Paul A. Baker, Michael W. Murphy, Eric Werner Anderson, Colin Whitby-Strevens, David Ferguson, Keith Diefendorff, and Ron Hochsprung, the entire disclosure of which is herein incorporated by reference in its entirety for all purposes The present application is related to the following commonly-owned U.S. patent application, which is herein incorporated by reference in its entirety for all purposes:

U.S. patent application Ser. No. 12/239,743, filed Sep. 27, 2008, for "Bridging Mechanism for Peer-to-Peer Communication".

BACKGROUND OF THE INVENTION

The present invention relates generally to computer I/O, and more particularly to packet-switched communications between computer system components.

The Peripheral Component Interconnect ("PCI") is a well established and widely deployed standard that specifies a computer bus for attaching peripheral devices to a computer motherboard. Successor standards such as PCI-X, which stands for Peripheral Component Interconnect Extended, have increased the bandwidth and addressed perceived shortcomings.

PCI Express, officially abbreviated as PCI-E or PCIe, is a serial packet-based protocol that provides higher yet transfer speeds, and addresses additional perceived shortcomings of PCI and PCI-X. In addition, there are a number of other peripheral interface standards (e.g., USB, FireWire, Ethernet) with wide deployment. As computers get smaller, it is sometimes difficult to accommodate the need to provide all the connectors that users have come to expect.

SUMMARY OF THE INVENTION

Embodiments of the present invention provide a high-speed converged I/O interface that allows a number of native I/O formats to be encapsulated into PCIe Vendor Defined Messages ("VDMs") for transfer over a single physical medium, preferably optical, and is thus referred to as the converged I/O ("CIO") interface.

Embodiments of the present invention can provide synchronization (time value, frequency, and phase) among a network of routers, with signal paths of several meters, thereby providing an accurate time base suitable for exacting audiovisual applications.

A further understanding of the nature and advantages of the present invention may be realized by reference to the remaining portions of the specification and the drawings.

DESCRIPTION OF SPECIFIC EMBODIMENTS

Embodiments of the present invention provide a high-speed optical interface for connecting computers to external I/O devices, including in some instances devices having bandwidth requirement in excess of common external interfaces. In a preferred embodiment, the interface is largely based on the industry-standard PCI Express ("PCIe") interface, with extensions discussed below to provide additional functionality. The interface allows a number of native I/O formats to be encapsulated into PCIe Vendor Defined Messages ("VDMs") for transfer over a single physical medium, preferably optical, and is thus referred to as the converged I/O ("CIO") interface. In a specific implementation, optical links between devices support high-speed serial communications, and the data is in the form of PCIe packets.

Figure 1:
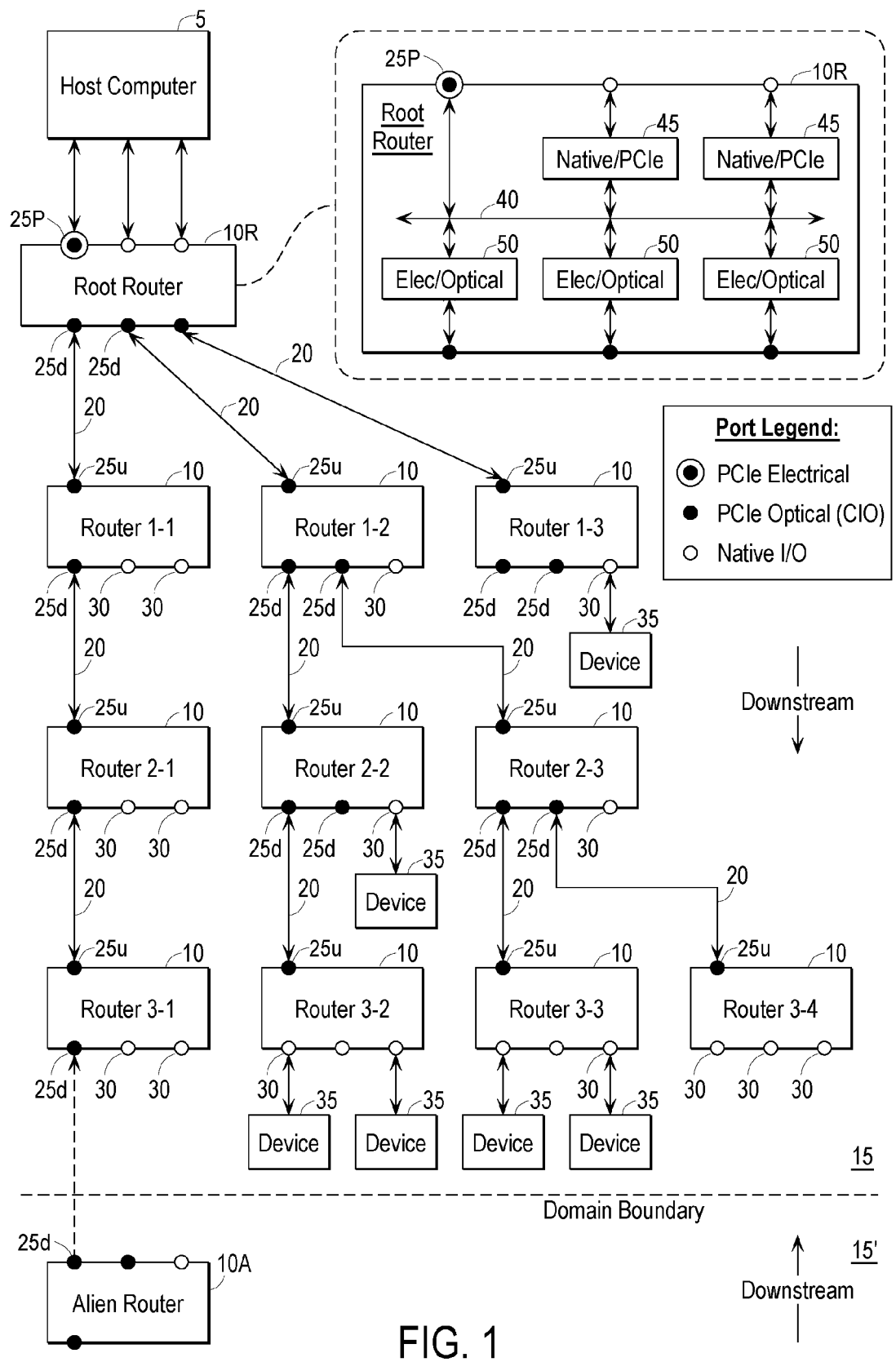
FIG. 1 is a block diagram of a representative system incorporating a converged I/O ("CIO") interface according to embodiments of the present invention.

FIG. 1 is a block diagram of a representative system according to embodiments of the present invention. The system includes a host computer 5 connected to a network of routers that includes a master or root router 10R and one or more downstream routers 10 (the figure shows multiple downstream routers). These routers are disposed in a domain 15, and are directly connected to each other by links 20, and communicate with one another by exchanging packets according to an extended PCIe protocol. The routers and links use the CIO interface; thus the routers are sometimes referred to as CIO routers and the links as CIO links.

Each router has one or more CIO ports 25, each of which can terminate a CIO link. CIO ports 25 are shown as solid black circles. Some of the routers have downstream-facing non-CIO ports 30, which are shown as hollow white circles. These will be discussed below. As a matter of terminology, when a first router's port is connected to a second router's port, that second router's port is sometimes referred to as the first router's linked port, and the first router's port is referred to as the second router's linked port.

Each port has associated port circuitry within the router that allows signals incoming at one port to be communicated to corresponding port circuitry of another port to be output from that other port. Since the internal signaling in the router is electrical, and the preferred CIO communication medium is optical, each CIO port has additional associated interface circuitry that includes an electro-optical element that converts electrical signals from the router to optical signals for output on the optical CIO links, and an opto-electrical element that converts optical signals on the CIO links to electrical signals for use by the router.

The routers are in a tree topology, which includes root router 10R at its root and one or more (the figure shows multiple) downstream routers. For definiteness, root router 10R is shown at the top of the figure, and the downstream routers 10 are shown below the root router. Upstream-facing CIO ports 25 are shown with a suffix "u" and downstream-facing CIO ports 25 are shown with a suffix "d." Every downstream router has an upstream-facing CIO port. Root router 10R does not have an upstream-facing CIO port, but has an upstream-facing PCIe port 25P (shown as a black circle centered in a white circle) that communicates with host computer 5. This provides the host computer access to the network of routers for configuration as well as memory writes and reads to and from devices connected to the routers.

While every router except the root router has an upstream-facing CIO port, routers need not have any downstream-facing CIO ports. FIG. 1 shows a number of possibilities, e.g., some routers have no downstream-facing CIO ports, some have one downstream-facing CIO port, and some have multiple downstream-facing CIO ports. The links are shown as bidirectional, but this is for simplicity; each link is composed of separate upstream and downstream unidirectional paths.

Every downstream router is directly connected via its upstream-facing port to the downstream-facing port of one and only one upstream router. Every downstream router is connected directly or indirectly (through one or more upstream routers) to the root router. Thus every downstream router has a unique path connecting it to the root router. Within the tree topology, leaf routers, namely routers that are not connected to any downstream routers, have an upstream-facing CIO port and may or may not have downstream-facing CIO ports. Each router that is not a leaf router has at least one downstream-facing CIO port.

Embodiments of the present invention provide for encapsulating (tunneling) native (non-PCIe) I/O formats within PCIe packets. To support this capability, some of the downstream routers are shown as having downstream-facing non-CIO ports 30, which are shown as hollow white circles. The non-CIO ports are for input and/or output of native I/O signals (e.g., USB, FireWire, Ethernet, PCIe, DisplayPort, DVI), as will be discussed in detail below. A number of non-CIO ports 30 are shown as having attached devices 35. The root router is also shown with two upstream-facing non-CIO ports, but they are for transport only and are not used to communicate control information.

The functionality of each router is that it can route signals at any port to any other port (CIO or non-CIO). However, as mentioned above, embodiments of the present invention support multiple stream types being carried over links in the network. Therefore, a transaction makes sense when the data is compatible with the destination to which it is being routed (e.g., while a router could direct USB data to a DisplayPort connection, there is little reason to carry out such a transaction).

For convenience, downstream routers 10 are labeled with a pair of numbers separated by a hyphen. The first number designates the level or distance to root router 10R, and the second number enumerates the routers at that level. In the particular scheme shown, the second number increases from left to right in the figure. Configuration and routing will be described in further detail below, but a preferred implementation uses a PCIe-type addressing scheme (extended to support some additional functionality). Thus elements within the routers are configured to understand which address ranges map to which ports. Consider an example where an I/O controller associated with host computer 5 wishes to establish a connection with a target device, say the lowermost, rightmost device in the figure.

To accomplish this, the host emits a packet that includes the target device's address, and provides that packet to port 25P. When the target device's address in the packet is presented to root router 10R, the middle CIO port of the root router recognizes that address as one that it is authorized to pass, and the packet is output from the middle CIO port of the root router and sent to router 1-2. In a similar manner, when the target device's address in the packet is presented to router 1-2, the packet is output from the middle (CIO) port of the router 1-2 and sent to router 2-3. In a similar manner, when the target device's address in the packet is presented to router 2-3, the packet is output from the left CIO port of router 2-3 and sent to router 3-3. In a similar manner, when the target device's address in the packet is presented to router 3-3, the packet is output from the right non-CIO port of router 3-3 and sent to the addressed device or otherwise used to access the addressed device.

In the above addressing mechanism, the information being sent contains an address, and each router receiving the information with that address determines which port is configured to accept that address. An alternative technique can establish the entire path as soon as the destination is known. Thus for the same example, a path can be established from the middle CIO port of the root router to router 1-2, from the middle (CIO) port of router 1-2 to router 2-3, from the leftmost CIO port of router 2-3 to router 3-3, and then from the rightmost non-CIO port of router 3-3 to the device.

FIG. 1 shows a second domain 15' below a domain boundary (denoted by a dashed line). Some embodiments of the present invention support inter-domain (peer-to-peer) connection where a router in one domain (in this case router 3-1) connects via one of its downstream-facing CIO ports to a downstream-facing CIO port of an alien router 10A in the other domain. Since domain 15' is drawn below domain 15, the downstream direction for domain 15' is up. With the exception of such peer-to-peer connections, a downstream-facing CIO port connects only to the upstream-facing port of a downstream CIO router. While router 3-1 happens to be a leaf router, the router that connects to a router in a different domain may or may not be a leaf router.

Peer-to-peer communications are the subject of the above-referenced concurrently filed U.S. patent application titled "Bridging Mechanism for Peer-to-Peer Communication." At this point it suffices to note that PCIe addressing does not support peer-to-peer connections. This functionality is provided by extending the PCIe addressing scheme to specify that a portion of the address identify an alien domain, and that extra logic (hardware and/or software) is used to implement the extension to the addressing scheme. A domain can be referred to in some contexts as a locus or a cloud.

FIG. 1 also shows additional details of root router 10R, but the details can easily be seen to apply to any of the other routers. The router includes an internal bus 40, and an arbitration mechanism determines when packets, which are stored in FIFOs (not shown) at the receiving sides of the different ports, are granted use of the bus so they can be routed to the appropriate port for output. Thus the bus can also be viewed as implementing a switch fabric. The signals passing through a given router (i.e., when they are inside the router) are, in specific embodiments of the present invention, PCIe electrical signals, while the signals incoming to the ports or outgoing from the ports are either native electrical signals or optical PCIe (CIO) signals.

Accordingly, each port except root router 10R's upstream-facing PCIe port 25P has associated circuitry for translating between PCIe and other formats. More particularly, each of non-CIO ports 30 has associated PCIe/native translation circuitry 45 and each of CIO ports 25 has an associated electrical/optical translation unit 50. Thus, incoming native (non-PCIe) signals are translated to PCIe signals for processing inside the router, and outgoing PCIe signals are translated to the native I/O format prior to those signals being output on the non-CIO port. Similarly, incoming optical signals are converted to electrical PCIe signals for processing inside the router, and outgoing PCIe signals are converted to optical signals for output on the CIO port.

The root router as shown in FIG. 1 could be replicated and deployed at other points in the network. However, one of the CIO ports would have to be the upstream-facing port, and the non-CIO ports could be used to provide the native I/O signals to devices such as disk drives, displays, or other peripherals (shown schematically as devices 35). The PCIe port would be downstream-facing, and would allow PCIe devices to be deployed at these different points within the network. The PCIe signals exiting PCIe port 25 would not need to be translated by the router into a different format. As well as supporting native PCIe devices, provision of the PCIe port as a downstream-facing port can also support devices that have their own built-in PCIe-to-native translation circuitry. For example, the host could communicate with a FireWire device that had its own PCIe-to-FireWire conversion circuitry without having to provide native FireWire signaling and without the routers having to contain PCIe-to-FireWire translation circuitry.

Figure 2:
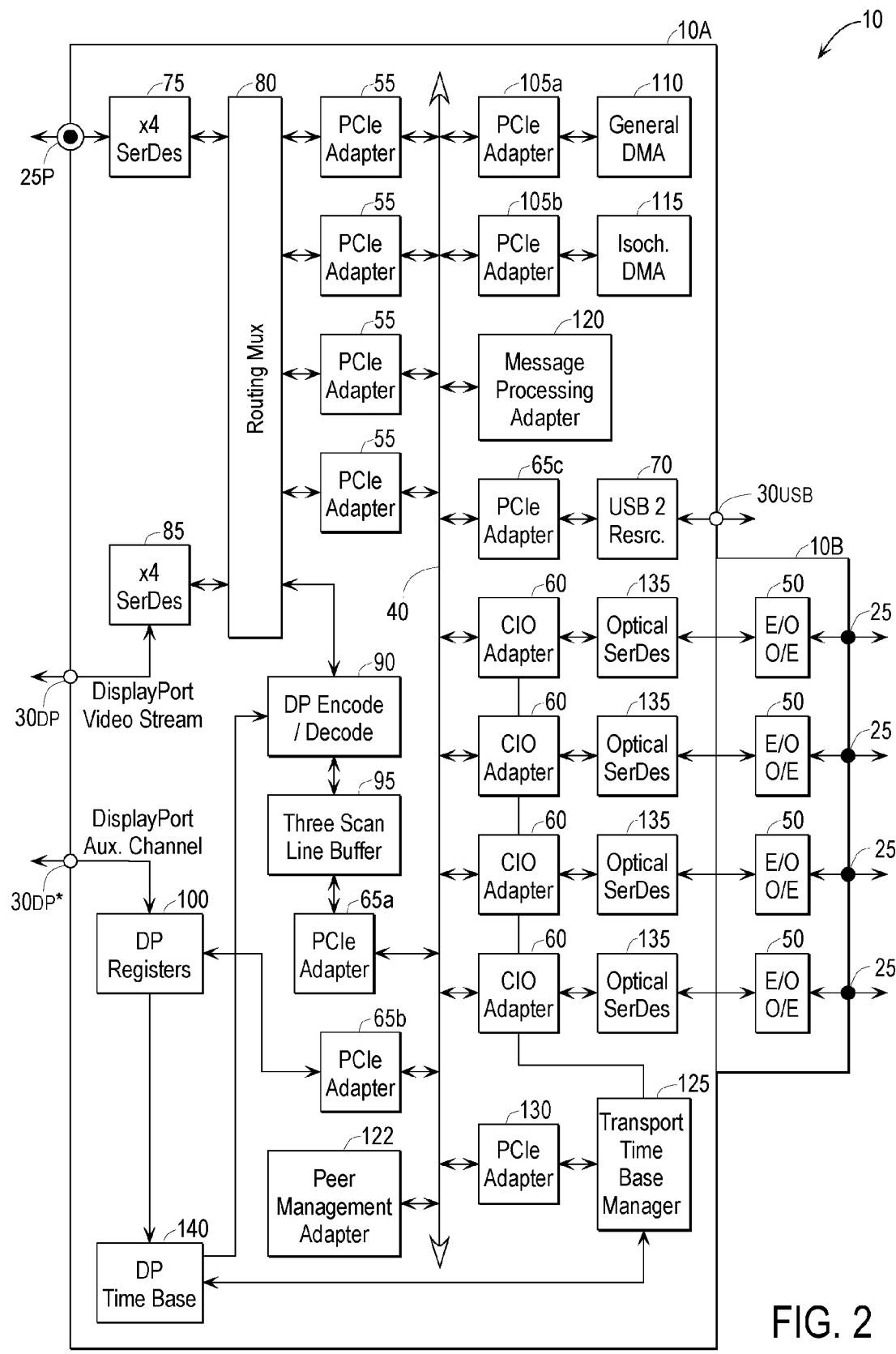
FIG. 2 is a block diagram showing additional details of a CIO router according to embodiments of the present invention.

FIG. 2 is a block diagram showing additional details of a representative CIO router 10 according to embodiments of the present invention. Where appropriate, elements corresponding to those shown in FIG. 1 are labeled with the same reference numerals used to label those elements in FIG. 1. For definiteness, the particular router shown has a PCIe port 25P, four CIO ports 25, and three non-CIO ports, a DP port 30DP for handling DisplayPort ("DP") streams, an auxiliary DP port 30DP* for handling the DP auxiliary channel, and a USB port 30USB for handling USB communications. While this particular router resembles root router 10R, and indeed could be used to implement the root router, it can also be used to implement any of the downstream routers. The router is in general bidirectional, but only one of the CIO ports can be upstream-facing (unless it is the root router, in which case the PCIe port would be the upstream-facing port).

Router 10 is shown as including two separate assemblies 10A and 10B. This schematically represents a specific embodiment of the present invention where the majority of the electronic components of the router are implemented in an integrated circuit (semiconductor chip) and the elements for converting electrical signals to optical signals and vice versa are implemented as a separate module (10B) that includes four instances of the electrical/optical translation units 50 of FIG. 1. While most of the connections inside the router are shown schematically as bidirectional, this is for simplicity; most of the connections include separate upstream and downstream unidirectional paths. Further, the ports as drawn represent logically distinct entities. This does not mean to say, for example, that some ports cannot share portions of the same physical connector. For example, the two DP ports can be part of the same physical connector with different pins for the DP stream channel and the auxiliary channel. In a preferred implementation, the electrical USB port connector can be integrated with the optical CIO connector. In such an implementation, the plugs on a cable that effects a CIO link can have the form factor of a USB "type-A" connector.

Every path that transfers incoming data from a port to bus 40 includes an adapter, and every path that transfers outgoing data from the bus to a port includes an adapter. In particular, Four PCIe adapters 55 are associated with PCIe port 25P; four CIO adapters 60 are associated with respective ones of the four CIO ports 25, a pair of PCIe adapters 65a and 65b are associated with DP ports 30DP and 30DP*, and a PCIe adapter 65c is associated with USB port 30USB. The PCIe adaptors include standard PCIe bridges (not separately shown) that have upstream-facing configuration registers, that store address ranges for the port, and FIFOs for storing incoming packets.

In accordance with specific embodiments of the present invention, the CIO adapters include standard PCIe bridges (not separately shown) that are modified to support peer-to-peer communications. One aspect of the modification is to provide an additional set of configuration registers that face downstream (the normal PCIe configuration registers can only be accessed from upstream). The CIO adapters provide the functionality of the PCIe adapters (e.g., PCIe bridges modified to support peer-to-peer communications), and in some embodiments are further modified to support special synchronization communications, to be discussed below, that are carried out between linked CIO ports.

A USB resource such as a host controller 70 is connected between PCIe adapter 65c and USB port 30USB, and provides USB/PCIe encoding and decoding. While USB host controller 70 is shown as connected to a single non-CIO port, it can be configured to provide multiple ports. Thus, the controller can fan out to provide electrical USB ports integrated with multiple CIO port connectors and any internal USB needs of a device containing the router. Additional adapters and circuitry will be discussed in their particular context.

Each of these PCIe adapters includes a PCIe bridge facing bus 40, so the back-to-back pairs of bridges provide the functionality of a PCIe switch. Each bridge includes registers storing the address ranges that it can accept, and the adapter includes logic for determining whether the attached port is authorized to accept data based on address information associated with the data. The adapters also can include one or more FIFOs for storing incoming packets. The adapters are bidirectional devices, but a given adapter can provide different functionality depending on whether it is before the bus or after the bus relative to the data flow. Additional details will be discussed below in connection with describing how data incoming at a specific port is handled, and much of the information will be relevant to the other ports. The modifications of otherwise standard PCIe bridges to provide additional functionality can be implemented by additional hardware, software, or a combination.

Each of PCIe adapters 55, CIO adapters 60, PCIe adapters 65a and 65b, PCIe adapter 70 contains ingress circuitry that operates on data entering the router from a port and egress circuitry that operates on data leaving the router. Ingress circuitry examines the data, extracts packet headers, stores packets (including headers and payload, if any) in FIFOs (not shown), and communicates available FIFO space (via credit messages) to the egress circuitry at the port at the other end of its link (referred to as its linked port). Packet header information is placed on the bus and examined by egress circuitry in other adapters on the bus. These adapters are configured with ranges of addresses that they are authorized to accept, and also maintain credit information representing available space in the FIFOs at their linked ports.

An adapter's egress circuitry includes a queue (not shown) for holding outgoing events. When the egress circuitry detects an authorized address, it adds information regarding the event (e.g., port holding the data and size of the message) to the end of its queue. When the event reaches the front of the queue, and the egress circuitry further determines that its linked port's ingress circuitry's FIFOs have sufficient space to accept the packets, the egress circuitry requests use of the bus for transferring the data held in the FIFOs of the ingress port that had posted that address. When use of the bus is granted, the data flows from the port holding the data, onto the bus, and out of the output port.

Consider first, PCIe serial data incoming to PCIe port 25P with address information specifying one of CIO ports 25 or non-CIO port 30USB. After the input signals are subjected to clock and data recovery, the serial data is deserialized by a serializer/deserializer (SerDes) circuit 75, frames are detected, and parallel data (e.g., in the form of 32-bit DWords) is communicated to a routing multiplexer 80. Depending on the number of desired PCIe ports, the data from SerDes 75 is distributed to one or more than one of the four PCIe adapters 55. Once the multiplexer's routing configuration is set, it remains static until the router or the host computer output format is reconfigured. The incoming data is handled by the ingress circuitry in the selected adapter(s) as discussed above.

Consider next, DisplayPort data incoming to DP port 30DP. The data, which includes a video stream, is subjected to clock and data recovery, and the serial data is deserialized by a SerDes circuit 85. The data is then routed to the decoding portion of a DP decoder/encoder 90, which decodes (interprets) the DP stream, creates a logical representation of the data being carried over the DP interface, and packages the representation into PCIe Vendor Defined Messages (VDMs). These VDMs are then sent to PCIe adapter 65a. A buffer 95 is interposed between the DP decoder and the adapter, and stores up to three scan lines worth of data to accommodate possible temporary congestion in the network. The data is transferred to the FIFO registers of PCIe adapter 65a, which sends the request to the bus. The egress circuitry for the port that is able to accept the request queues the request, and handles the request as discussed above.

Consider next, DisplayPort auxiliary channel data incoming to auxiliary DP port 30DP*. Write data is stored in DisplayPort registers 100 and the contents communicated to PCIe adapter 65b, which sends the request to the bus. The egress circuitry for the port is able to accept the request queues the request, and handles the request as discussed above. The accepting CIO port is the same port that is configured to accept DisplayPort stream packets since the video stream channel and the auxiliary channel are destined for the same endpoint. The DisplayPort auxiliary channel is bidirectional, and the DisplayPort registers can also store display identification data that the connected display provides to allow the host to determine the display's capabilities.

Also coupled to bus 40 through respective PCIe 105a and adapters 105b, but not associated with any specific port, are a general DMA unit 110 and an isochronous DMA unit 115. The general DMA controller sets up DMA transfers when commanded to do so, while the isochronous DMA controller only does so at specified times. The router also includes a message processing adapter 120 and a peer management adapter 122. The message processing adapter (sometimes referred to as the message processing unit or "MPU") supports the generation of VDMs that are used for DP transport, peer-to-peer communications, and time base management as will be discussed below. The peer management adapter (sometimes referred to as the peer manager unit or "PMU") supports the peer-to-peer functionality that was mentioned briefly above and is the subject of the above-referenced concurrently filed U.S. patent application titled "Bridging Mechanism for Peer-to-Peer Communication."

One feature of the router is that it can participate in an orchestrated series of exchanges with other routers in the network to maintain a common time reference. This is supported by a transport time base manager or time manager unit ("TMU") 125. While TMU 125 is shown as a single block coupled to the bus through a PCIe adapter 130, it cooperates with circuitry in CIO adapters 60, which is shown schematically as a line going to the CIO adapters.

The mechanisms for providing a common time reference be described in greater detail below. At this point it suffices to note that the TMU operates to generate and receive synchronization messages (implemented as VDMs) that are sent between linked CIO ports. In a representative embodiment of the present invention, these messages are sent at intervals on the order of 10 µs. One of the routers is designated the TimeMaster and transmits messages containing its clock count that are relayed to all the other routers. Additionally, messages are sent between linked ports to allow each port to lock its frequency and phase to that of the TimeMaster.

Regardless of its format when it entered the router, data transferred across the bus for egress has the logical form of PCIe packets. Incoming PCIe traffic remains PCIe traffic (e.g., standard messages being used for information that originates within a CPU producer/consumer model representing reads and writes to memory space, I/O space, or configuration space). VDMs are used to transport information outside the CPU producer/consumer model. This includes native I/O that is transported across the CIO fabric (such as the DisplayPort example discussed above). It also includes the synchronization messages under control of TMU 125 mentioned above.

Parallel PCIe packet data leaving the egress circuitry of CIO adapters 60 is serialized by respective SerDes circuits 135, which are labeled "Optical SerDes" to signify that they are higher speed devices to support the higher bit rates of data transported on the optical CIO links. The data from each of the optical SerDes circuits 135 is communicated to the electrical-to-optical portion of a respective electrical/optical translation unit 50. The serial data is then carried over the optical link to the next router. Parallel PCIe packet data leaving the egress circuitry of PCIe adapter 65c is converted to USB format by USB controller 70 and output on USB port 30USB.

The above discussion was directed primarily to data entering the upstream-facing ports and being routed to one of the downstream-facing ports. The discussion applies substantially symmetrically to the case of data entering one of the downstream-facing ports. One case worth noting is that of the DisplayPort data that was described above. Once the DP data has traveled to its destination upstream-facing CIO port, it is routed so as to exit a downstream-facing DP port. Thus while the DisplayPort video stream channel is unidirectional, the routers preferably provide bidirectional circuitry (adapters, SerDes circuits, DP encode/decode circuit). This is so that the same design of router can handle the transformation of the VDMs carrying the DP video stream back to a format that the endpoint device (i.e., a display or other consumer of a DisplayPort stream) can accept.

Consider next, this reverse process, which is recreating the DisplayPort stream from the DisplayPort data VDMs that were output by the router as described above. The VDMs presented to bus 40 by one of CIO adapters 60 are communicated to PCIe adapter 65*a* and the encoding portion of DP decoder/encoder 90, which decode the VDMs and encode the data into the desired DisplayPort stream for output at DP port 30DP through SerDes circuit 85. DisplayPort time base circuitry 140 cooperates with TMU 125 to restore the timing information that was present in the DisplayPort stream when it was entered the first router's input DP port. As mentioned above, TMU 125 provides a common time base over the network of routers.

Figure 3:
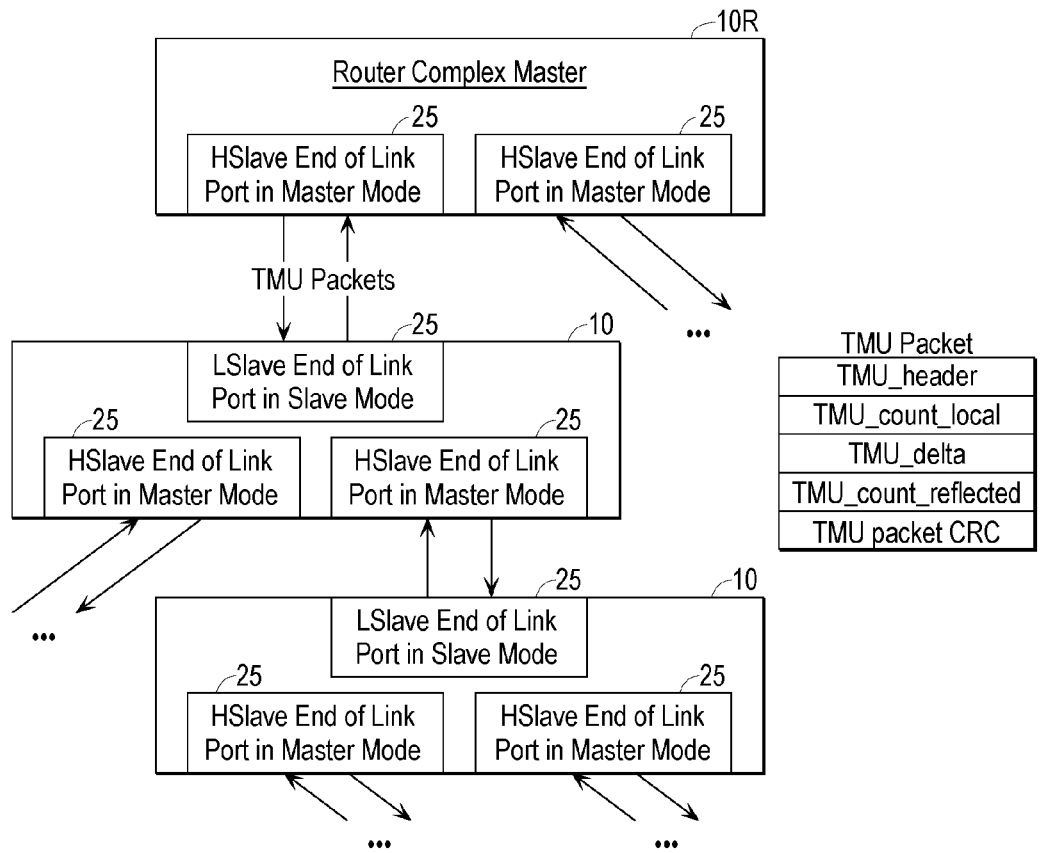
FIG. 3 is a block diagram showing how routers in a system exchange time management unit ("TMU") packets to establish a common time base among the routers according to embodiments of the present invention.

FIG. 3 is a block diagram showing how routers in a system exchange time management unit ("TMU") packets to establish a common time base among the routers according to embodiments of the present invention. This is referred to as synchronization or "syncing." As discussed above in connection with FIG. 2, the functionality of providing a uniform time base is handled by TMU 125. Embodiments of the present invention provide a very fine degree of synchronization, thus making systems based on the CIO routers capable of supporting demanding applications such as audiovisual editing and playback.

Syncing has two aspects: the first is "frequency-lock/latency-lock" of a time reference of each router, and the second is a common time count, based on the locked frequency. TMU timing circuits (to be described below) in each router trim each router's TMU time base using information from the TMU packets and their field elements to achieve frequency-lock/latency-lock. The system time count is a system level function, which can be managed by software. This function is supported by hardware registers that are clocked on the TMU's clock elements.

FIG. 3 shows three levels of routers, including root router 10R at the top level, and two downstream routers 10 at successively lower levels below the root router. A system of interconnected routers can have high level software that designates one of the routers to be a RouterComplexMaster for the entire router complex (which includes peer-to-peer connections across multiple domains). As shown in the figure, the root router has been designated the RouterComplexMaster, but this is not necessary. For example, in a multi-domain system, there would be multiple root routers, but only one RouterComplexMaster. The remaining routers are slave devices with respect to the time syncing, with the master/slave relationship of router pairs is established by software as well. One configuration has the PCIe root router as the RouterComplexMaster within its local domain at power-up/reset, and slaves the other devices other devices in the domain to the RouterComplexMaster. Peer-to-peer connections would remain un-synchronized until software configures the system.

An individual port can be master or slave. Setting the port modes establishes all master slave relationships. As a matter of nomenclature, the term "high order slave" (HSlave) refers to the end (of a link) closer to the RouterComplexMaster, than the "low order slave" (LSlave) end. A slave is an LSlave in communicating toward the RouterComplexMaster and it is an HSlave in communicating away from the RouterComplexMaster, to next lowest order slave. The highest order HSlave is the RouterComplexMaster. Within a device the port toward the RouterComplexMaster is in Slave mode. Similarly ports away from the RouterComplexMaster are in Master mode. This nomenclature is demonstrated in FIG. 3, with the ports of the routers labeled to designate the end of the link and the mode of the port. As a matter of convenience, the port at the HSlave (or LSlave) end of the link will sometimes be referred to simply as the HSlave (or LSlave).

Figure 4:
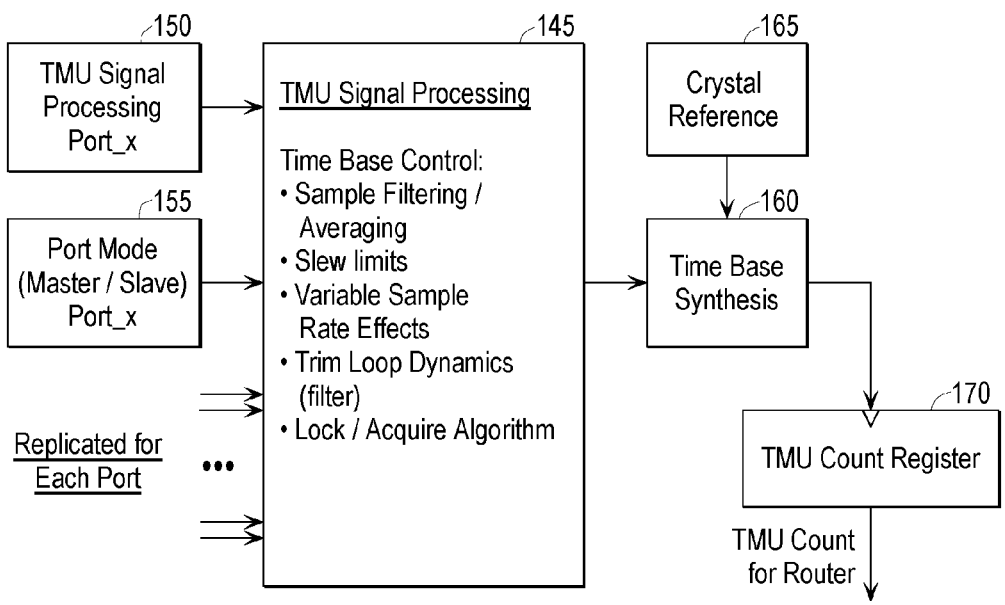
FIG. 4 is a block diagram of a time management unit ("TMU") that can be used in routers according to embodiments of the present invention.

FIG. 4 is a block diagram of TMU 125 according to embodiments of the present invention. The TMU includes a signal processing unit 145, which receives information from signal processing circuitry 150 in each port, including the port mode 155. Signal processing unit 145 performs such time base control actions as sample filtering and averaging, determining slew limits, managing variable sample rate effects, trim loop dynamics, and implementing a lock/acquire algorithm. Signal processing unit 145 controls a time base synthesis circuit 160, which is driven by an un-spread reference oscillator 165. The time base synthesis circuit drives a TMU count register 170 (TMU_count), from which the required timings are derived.

The local oscillator reference can be, for example, a 25.0 MHz crystal oscillator. The units of time in the TMU are nanoseconds. The 25 MHz is multiplied up so as to provide a binary count with a nanosecond base. A count resolution as fine as 2 ns is preferred. As will be discussed in greater detail below, time base synthesis circuit 160 includes a mechanism such as a phase accumulator to support trimming of the frequency value in a controlled way. If the 25-MHz crystals have a tolerance on the order of ±100 ppm (e.g., ±2.5 KHz), this sets an order of magnitude on the degree of trim to be handled by the time base synthesis circuit. In preferred embodiments, the spectral purity and discrete tones are consistent with that required for audio, and the tuning range supports any margining oversample rates that need to be considered.

The packets that are communicated between adjacent routers include a TMU_header field, a TMU_count_local field, TMU_delta fields, the TMU_count_reflected field, and the packet's CRC field. The use of the fields is the same with respect to the Master or Slave mode of a port. The usage of results within the TMU, however, varies according to the port's mode (Master or Slave). The TMU_count_local field serves as both the packet ID and the time.

The TMU_count register is a 32-bit register with two sub-fields, a 19-bit TMU_nsec_count field, and a 13-bit TMU_mid_count field. TMU_nsec_count has a resolution of 250 ps, and a MSB roll over of 131.072 µs. This 131.072-µs interval is taken to define the TMU_pulse. TMU_mid_count is a 13-bit binary extension of TMU_nsec_count, with a resolution of 131.072 ns, which rolls over at 2^30 ns (~1.07 seconds). The TMU_mid_count register effectively counts the previously defined TMU_pulse events. There is a 16-bit binary sub-extension to TMU_count, namely TMU_sub_nsec_cnt, which is defined to have a range of 2^-18 ns to 2^-2 ns.

Two System_time count registers, System_mid_count, and System_32MSB_count, are provided to allow software configuration. The general usage is to define the time uniformly across the router complex. System_mid_count is a 13-bit field with a LSB of 2^17 ns, which is 131.072 µs. System 32MSB_count is a 32-bit binary extension of System_ mid_count. Its resolution is 2^30 ns, which is ~1.07 seconds. Each count of the System_mid_count register is a count of the TMU_pulse.

The TMU_count and System_time fields, and their subfields and extensions, are summarized in the table below, where the least significant bit (LSB) is on the left:

| 16 bits: | 19 bits: | 13 bits | 32 bits: |
|---|---|---|---|
| LSB is 2^-18 ns | LSB is 250 ps | LSB is 2^17 ns, or 131.072 μs | LSB is 2^30 ns, or 1.073741824 seconds |
| | | TMU_count | |
| TMU_sub_nsec_cnt | TMU_nsec_count | TMU_mid_count | |
| | | System_time | |
| | | System_mid_count | System_32MSB_count |

The TMU_sub_nsec_cnt field's 2^-18 ns resolution is defined to be consistent with the network range. The TMU_nsec_count field's 250 ps LSB means that the third least significant bit has a 1-ns resolution, and rolls over 131,072 ns or 131.072 μs. The TMU_mid_count field rolls over 1.073741824 seconds. The System_32MSB_count field's resolution on the order of a second means it rolls over after more than 100 years.

The latency can be computed for a HSLave to LSlave link. The computed latency is used to align the start of the TMU_pulse boundary in each device. Aligning the TMU_pulse is achieved by trimming the Slave device time reference frequency to lock frequency/latency. This process compensates for the nominal latency over the physical electro-optical transport of the CIO links (Tx PHY, optical, Rx PHY, etc.). The objective is to align the edges of the TMU_pulse in the various devices across the router complex. Time base errors larger than 131.072 μs can be addressed at a software level with system time register updates to be discussed. The phase alignment method distinction is designed to fall on a clean binary bit boundary; this design uses the TMU_pulse as the boundary, which is the 2^17 ns figure discussed above. The TMU_count count field depth will support a 2^30-ns interval (~1 second) to prevent ambiguity of register reads spread over time across the router complex.

The System_time count register fields (i.e., System_mid_count and System_32MSB_count) can be updated in a synchronous manner across the router complex. This is done by copying the contents of the System_cnt_update field into the System_count registers in response to a match between the System_post_count register and the System_time count register fields. System_cnt_update is loaded on a TMU_pulse event. The TMU_count fields are not updated by software; rather, their values are updated by hardware frequency/latency locking.

Fine resolution is maintained in the (TMU_nsec_cnt, TMU_sub_nsec_cnt) counters. As described earlier, the hardware will lock the TMU counters across the router complex aligning the TMU_pulse event. Mid term time accounting is duplicated by the TMU_mid_count (which can be read but not written) and the System_mid_count (which can be read and written). The mid count registers increment on the TMU_pulse event, the long term time (~>1 second) is accounted by the System_32MSB_count.

Counters are preferably latched on reads so that a sub-64-bit access from any router port can acquire the time coherent with the first part of the read. The read latch is duplicated per router port to facilitate reads from any port concurrently.

A 64-bit read of the System count will return the TMU_nsec_cnt field mapped into the lowest significant bits below System_mid_count. In reading the TMU_count field, a 32-bit read returns TMU_nsec_count concatenated with TMU_mid_count. A 64-bit read returns TMU_sub_nsec_cnt concatenated with TMU_mid_count concatenated with TMU_mid_count. Reads to TMU count registers will be latched per router port to facilitate sub 64-bit accesses.

The time alignment below 131.072 μs is done with hardware adjustments of the slave time base; time alignment above 131.072 μs is a system concept and is managed with software using the system registers described.

Figure 5:
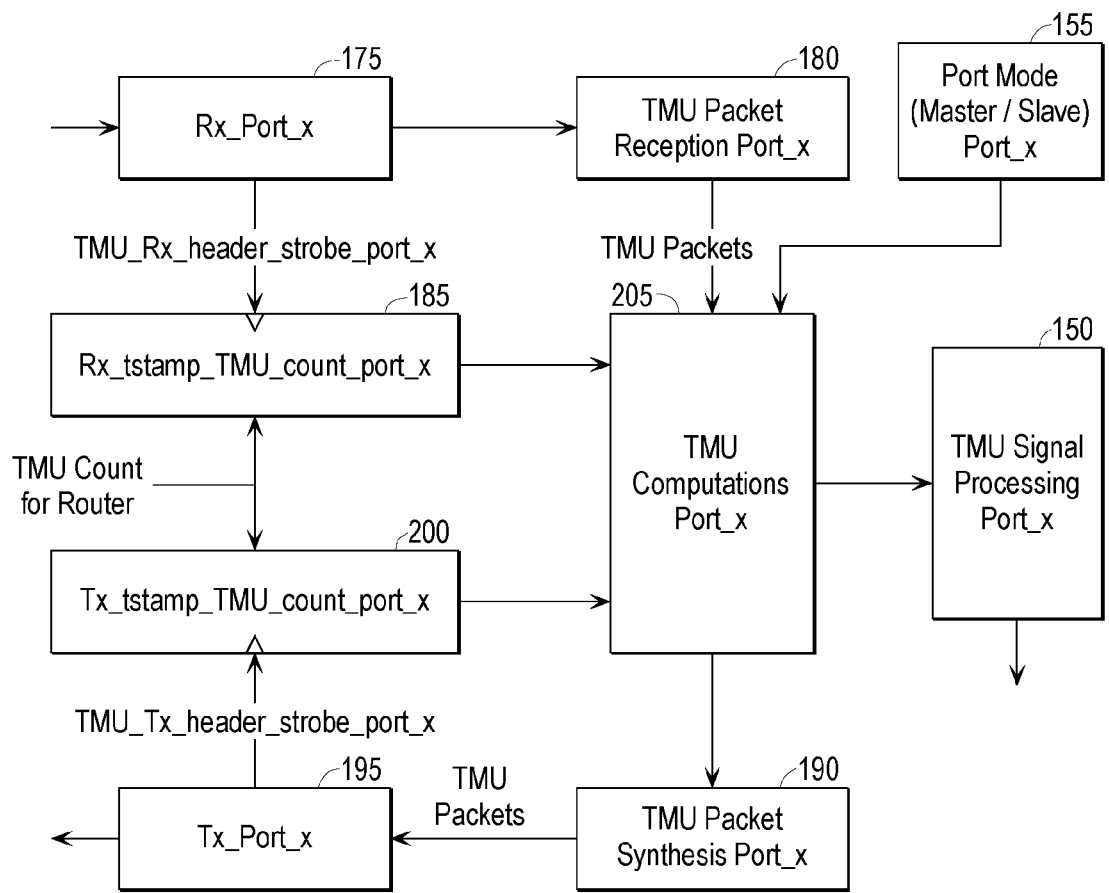
FIG. 5 is a block diagram of circuitry that can be disposed in each port to communicate with the TMU and with other ports according to embodiments of the present invention.

FIG. 5 is a block diagram of circuitry that can be disposed in each port to communicate with the TMU and with other ports according to embodiments of the present invention. This circuitry, described here at a block diagram level, will be described in greater detail below. Here it suffices to describe the basic structures that support the overall timing flow. On the receiving side, each port has a receiver 175, TMU packet reception circuitry 180, and a TMU receive timestamp latch 185, labeled Rx_tstamp_TMU_count_port_x. On the transmission side, each port has TMU packet synthesis circuitry 190, a transmitter 195, and a TMU transmit timestamp latch 200, labeled Tx_tstamp_TMU_count_port_x. The timestamp latches and the TMU packets from the TMU packet reception circuitry are communicated to TMU computation logic 205, which provides output data to TMU signal processing circuitry 150 and TMU packet synthesis circuitry 190.

Figure 6:
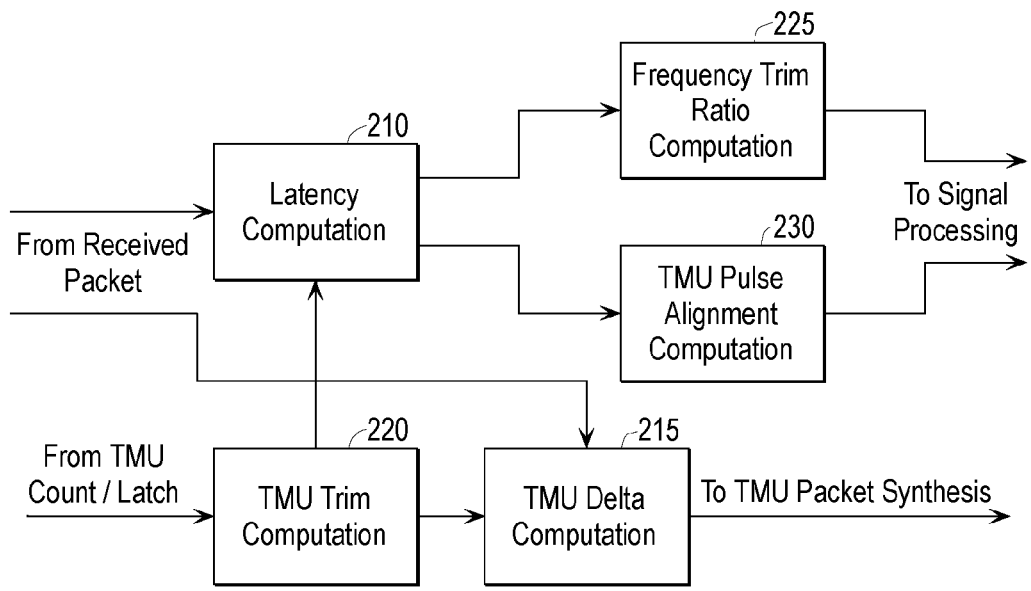
FIG. 6 is a block diagram showing additional details of the TMU computation logic shown in FIG. 5.

FIG. 6 is a block diagram showing additional details of TMU computation logic 205 shown in FIG. 5. As can be seen, received packet data is communicated to latency computation logic 210 and TMU delta computation logic 215. Trim computation logic 220 receives values from TMU receive timestamp latch 185 and TMU transmit timestamp latch 200, and provides data to latency computation logic 210 and TMU delta computation logic 215. The results from latency computation logic 210 are communicated to frequency trim ratio computation logic 225 and TMU pulse alignment computation logic 230. Additional details of the structure and operation of various of the blocks shown in FIGS. 5 and 6 will be described and illustrated below.

It should be understood that the transmitter and receiver also operate on non-TMU related information; for simplicity the paths for this are not shown. Thus while the TMU packets, which are a type of SKIP packet, are inserted at the SKIP packet multiplexer, the multiplexer is not shown explicitly.

In operation, the TMU packet is formed and waits for the SKIP insert multiplexer to direct it into the transmitted stream. The sending of the TMU packet causes transmitter 195 to fire a strobe signal TMU_Tx_header_strobe_port_x, which causes the content of the TMU_count register to be latched into the Tx_tstamp_TMU_count_port_x transmit timestamp latch, thus recording the TMU_count of when the packet was actually transmitted. For example when the TMU packet is latched into the outbound shift register, this fires the strobe recording the TMU time, and this recorded TMU time is sent in the next TMU packet as TMU_count_local. Thus, the TMU_count transmit timestamp for TMU packet n, arrives in TMU packet n+1.

The time measurement point uses the time the signal arrives at the pad of the die as the reference time. A hardware register TMU_Tx_trim_hw is used to store the delta from when the TMU count is recorded and when the outbound packet's first bit arrives at the die pad. This will generally be a fixed value and is recorded in a hardware read only register at mask time. This allows time to be known to a fixed hardware point, while allowing flexible system design. The packet insertion strobe initiation should be after any wait periods (due to data traffic conditions/states). It should be a fixed number of cycles and only analog delays to the pin. Since the PHY clock and the TMU clock are not necessarily phase locked (or even if they are the Tx domain may be spread) there is a time domain crossing error. These cycle drifts between the two non-locked (or spread) domains are designed so that they will average out.

Receiver 175 similarly fires a strobe signal TMU_Rx_header_strobe_port_x upon receipt of a TMU packet, which causes the content of the TMU_count register to be latched into the Rx_tstamp_TMU_count_port_x receive timestamp latch. The Rx PHY arrival time point is referenced to the die pad site. A TMU_Rx_trim_hw register is used to code the delta from when the first bit of the TMU packet encounters the die pad to when the TMU counter is actually strobed. This will generally be a fixed value and is recorded in a hardware read only register at mask time. This allows a flexible device design yet a precise understanding of when the signal was actually received at a known hardware point. This is used for accurate latency calculations.

The LSlave locks its frequency to that of the HSlave as follows. The HSlave sends a first TMU packet at a time t0 and a second TMU packet at a time t1. The two TMU packets have respective transmit timestamps tHSlave_Tx(t1) and tHSlave_Tx(t0), which are in terms of the HSlave's time base. These are communicated in the TMU_count_local fields of the TMU packets (one packet delayed as mentioned above). The LSlave receives these packets, provides them with receive timestamps tLSlave_Rx(t0) and tHSlave_Rx(t1), which are in the LSlave's time base.

From the contents of the TMU packets, the LSlave can determine how many HSlave TMU time base counts occurred between the sending of the two received packets. From the receive timestamps tLSlave_Rx(t0) and tLSlave_Rx(t1), the local TMU count is known and an error signal is made by the difference of the HSlave increment (from t0 to t1) and the LSlave increment (from t0 to t1), which can be used to trim the local TMU time base. This will facilitate frequency locking the LSlave to the HSlave. The frequency will be locked when the difference of the sending timestamps in the HSlave's time units equals the difference of the receiving timestamps in the LSlave's units.

Latency is determined by an HSlave sending a TMU packet with a transmit timestamp tLSlave_Tx to the LSlave and the HSlave returning a packet with a receive timestamp tLSlave_Rx (both timestamps at the LSlave). The outgoing and return packets are matched by use of the TMU_count_reflected field. The LSlave determines the total round trip time by subtracting the transmit timestamp from the receive timestamp. However, this time includes the time spent at the HSlave, which is determined by the HSlave as follows. The HSlave computes the time by subtracting the receive timestamp tHSlave_Rx at the HSlave from the transmit timestamp of the return message tHSlave_Tx. This give a value for the TMU_delta field that is returned to the LSlave (in the packet that is one later than the return packet that provided the total roundtrip time).

The latency, which is defined by the time a packet spends in transit, is given by half of the total roundtrip time less the time spent in the HSlave as follows:

$$\text{Latency} = \{[tLSlave\_Rx - tLSlave\_Tx] - [tHSlave\_Tx - tHSlave\_Rx]\}/2$$

This assumes that the transit times on the upstream and downstream unidirectional paths of the link. The latency information is used to align the phase of the TMU pulse in the LSlave to the TMU pulse in the HSlave. The latency information is adjusted by the trim values (TMU_Tx_trim_hw, TMU_Rx_trim_hw, TMU_Tx_trim_sw, TMU_Rx_trim_sw) to account for signal-to-strobe time skews for each port.

The latency information per sample can be affected by domain crossing phase alignment unknowns. The design uses averaging to eliminate the domain crossing boundary terms to a large degree. The strobes need to progress from the PHY detection points (which are fixed cycle counts from the die pads plus some analog delay to the TMU unit crossing only this one time domain boundary. The statistics of the error incurred by the domain crossing are assumed to integrate out with averaging.

Prior to the HSlave/LSlave pair acquiring lock, the LSlave knows the frequency error, as well as the latency and can then accomplish frequency/latency lock in a controlled way. In particular frequency changes, rate of frequency change, time to align TMU pulse edges across the router complex are bounded for minimal AV impact. The frequency is preferably synthesized to at least an accuracy of 0.1 ppm, at drift rates below the resolution a control loop toggles between the bounding states giving the correct average rate. This synchronizing control/loop parameters and input sample averaging is performed in the frequency/latency signal processing block of the design. This block also adapts to highly variable sample rates from ~1-μs sample intervals to ~1-second sample intervals.

The TMU packets in a HSlave/LSlave link pair are initiated by on the TMU_sync event. The HSlave (whose port is in master mode) will respond to the slave mode input and create the packet to be returned to the LSlave on the next TMU_sync event. The value of the TMU_count that triggers a TMU_sync is adjustable and is set by the TMU_sync_cnt register. Factors that effect the value used may vary across the router complex. The TMU_sync interval should be large enough to allow all TMU packets to encounter a SKIP packet opportunity for the TMU Packet to be transmitted to the receiver.

Low bandwidth links that operate in a hiccup mode, will automatically gate the TMU packet flow, as there will be no SKIP packets released. When the link comes up, the TMU packet is released and restarts the process, giving a burst of TMU packets at the TMU_sync event rate while the link is up (burst duration depends on the up time). Timing accuracy can vary to some degree due to effective TMU packet rate. Received TMU packets are examined to see if their TMU_count is within a recent_threshold, and are discarded if they are not. This filters out stale data due to a link that has gone inactive over a stale_threshold time. The filter function is done by the receiver's packet filter block.

TMU packets are unique per HLSlave/LSlave link pairs due to queue depths per port, transport timings, etc. The Latency_trim values are also in general unique per port. Dropped TMU packets lower the update rate in a transient way, but it should not cause the router complex to drop our of sync, providing the dropping was not continuous. Dropped TMU packets are not retried.

The lack of input from a HSlave can be treated two ways under software control: (1) the LSlave could stop its tuning, and remain at the last ratio of its time base to reference ratio as set by the phase accumulator settings, or (2) the LSlave could be trimmed in a controlled way to use its reference as the frequency standard. In either scenario it becomes the Master to all lower order LSlaves.

Figure 7:
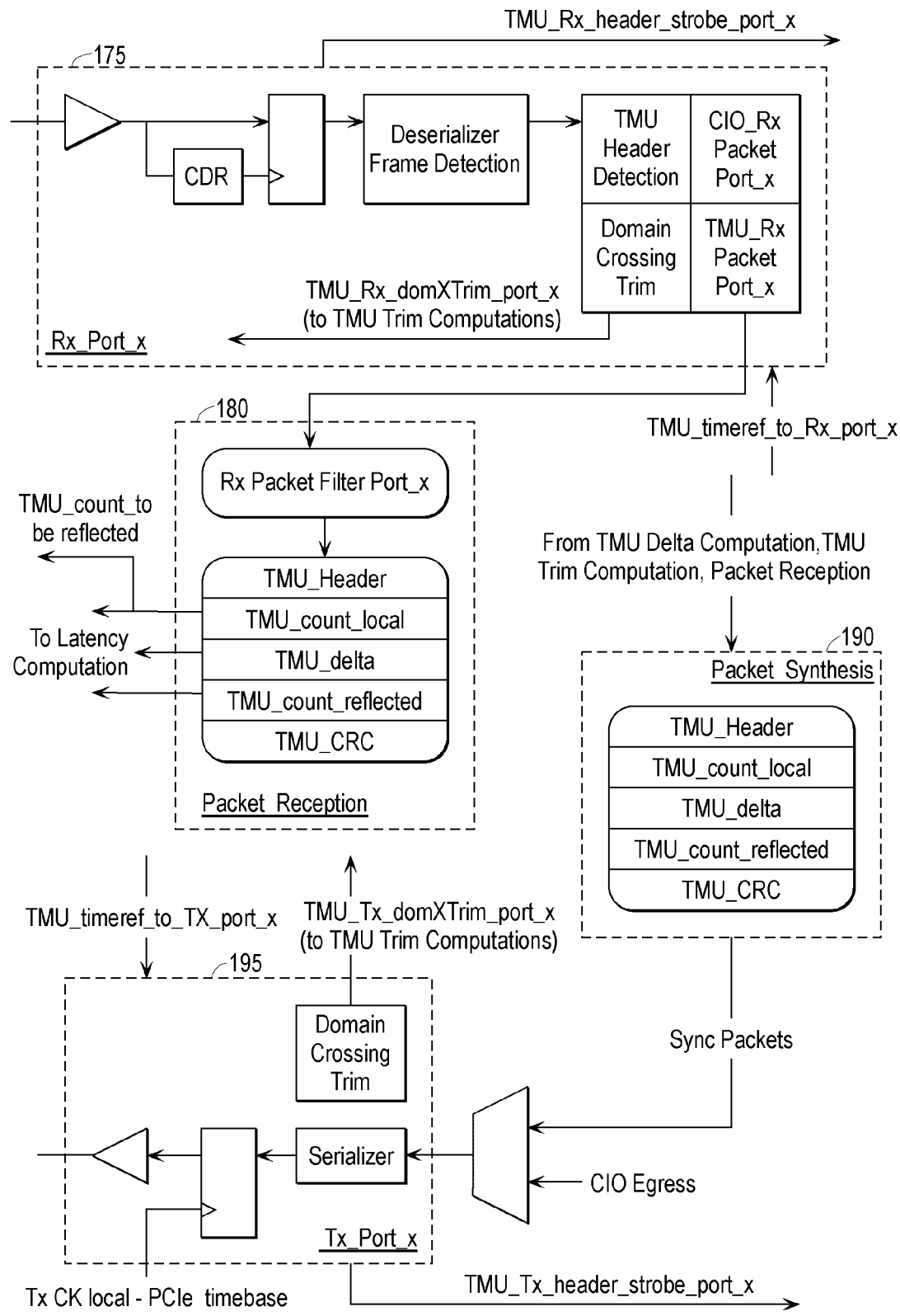
FIG. 7 is a block diagram showing additional details of the receiver, TMU packet reception circuitry, TMU packet synthesis circuitry, and transmitter shown in FIG. 5.
Figure 8:
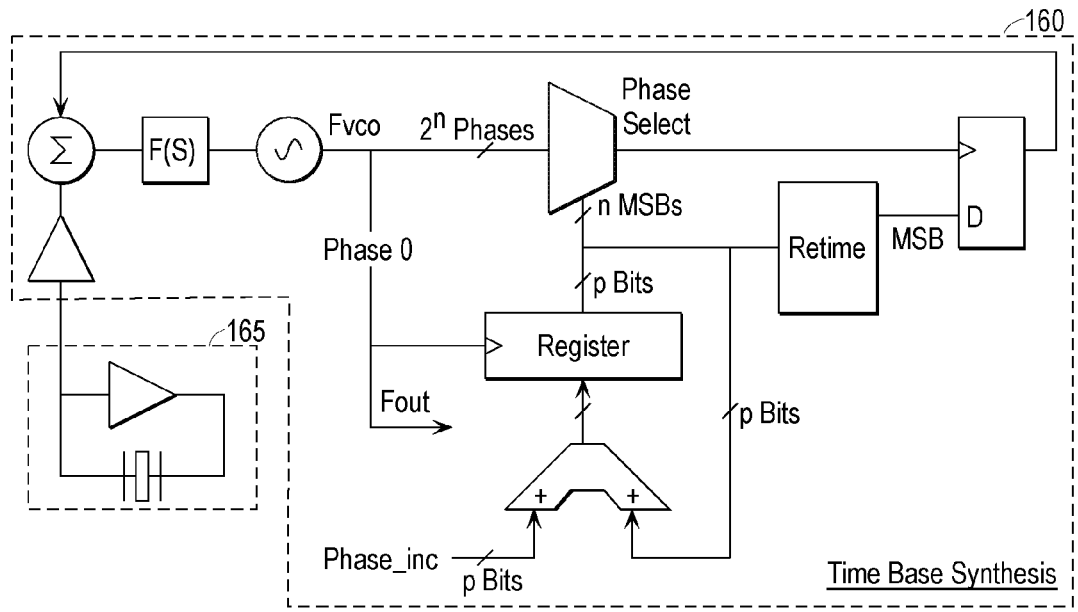
FIG. 8 is a block diagram showing additional details of the time base synthesis circuit 160 and reference oscillator shown in FIG. 4.
Figure 9:
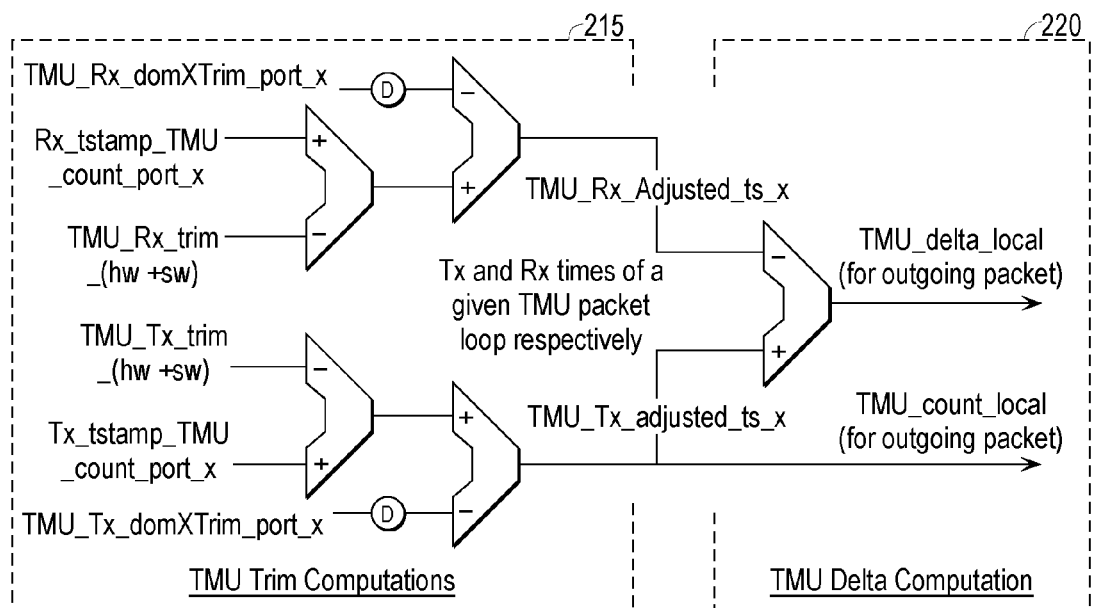
FIG. 9 is a block diagram showing additional details of the TMU_delta computation logic and trim computation logic 220 shown in FIG. 6.
Figure 10:
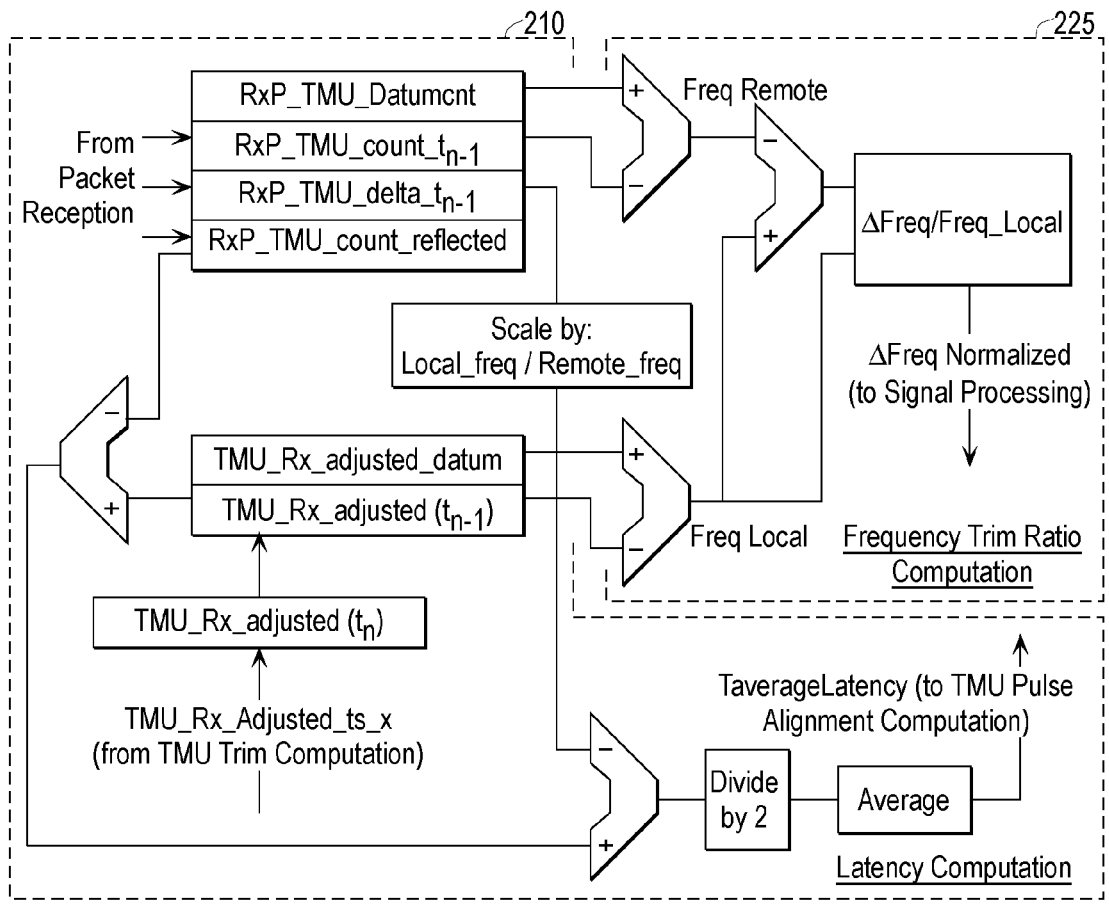
FIG. 10 is a block diagram showing additional details of the latency computation logic and frequency trim ratio computation logic shown in FIG. 6.
Figure 11:
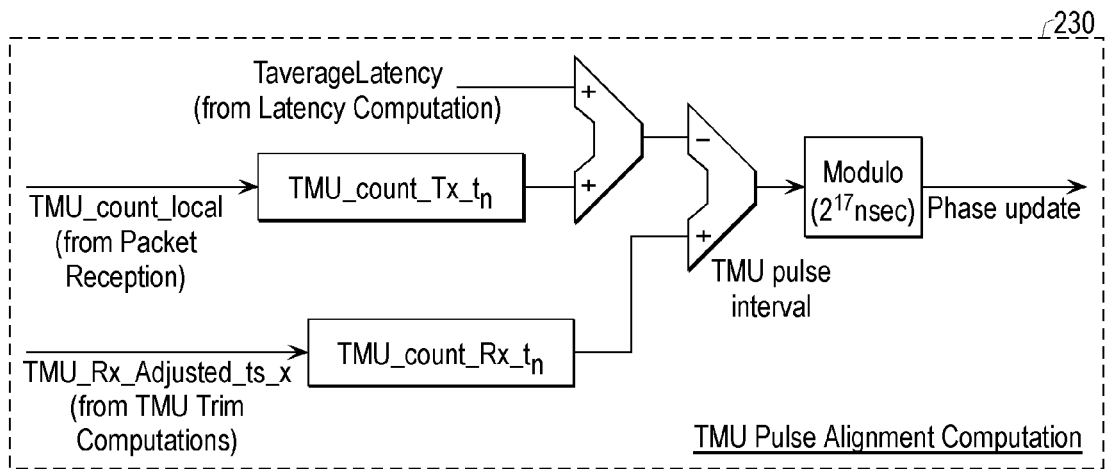
FIG. 11 is a block diagram showing additional details of the TMU pulse alignment computation logic shown in FIG. 6.

FIG. 7 is a block diagram showing additional details of receiver 175, TMU packet reception circuitry 180, TMU packet synthesis circuitry 190, and transmitter 195 shown in FIG. 5. FIG. 8 is a block diagram showing additional details of the time base synthesis circuit 160 and reference oscillator 165 shown in FIG. 4. FIG. 9 is a block diagram showing additional details of TMU delta computation logic 215 and trim computation logic 220 shown in FIG. 6. FIG. 10 is a block diagram showing additional details of latency computation logic 210 and frequency trim ratio computation logic 225 shown in FIG. 6. FIG. 11 is a block diagram showing additional details of the TMU pulse alignment computation logic 230 shown in FIG. 6.

Figure 12A:
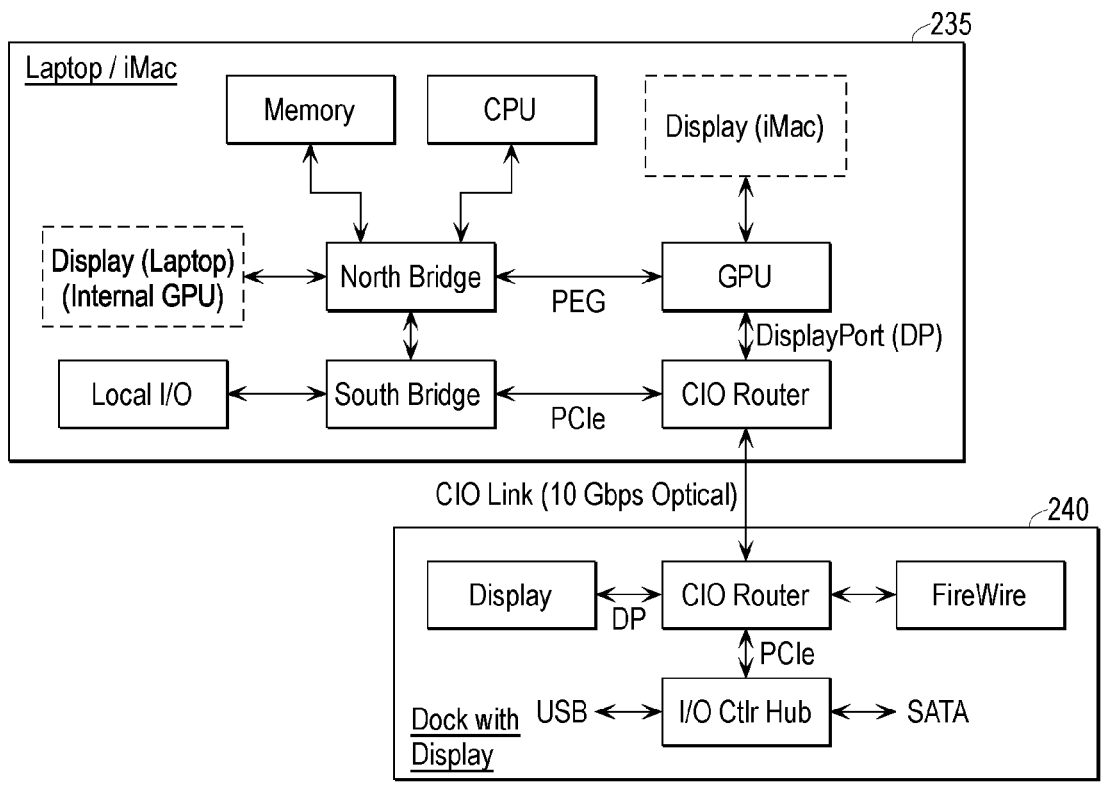
FIG. 12A is a block diagram of a computer system showing how a CIO router in a computer can be used to communicate with a CIO router in a dock having a display.
Figure 12B:
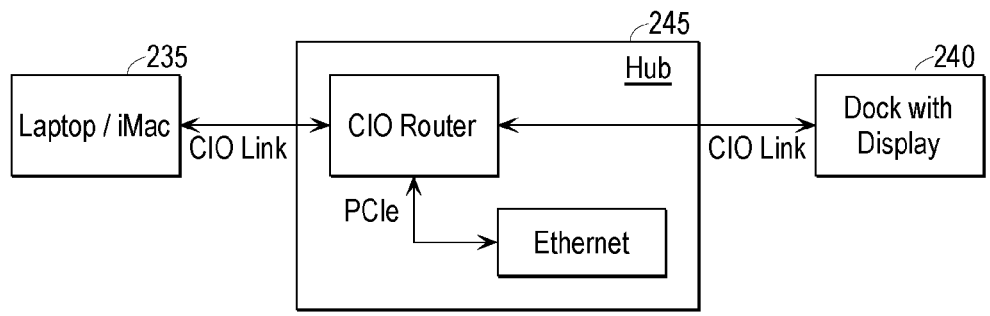
FIG. 12B is a block diagram of a computer system showing how a CIO router in an Ethernet hub can be disposed between the CIO routers of the computer system of FIG. 12A.
Figure 12C:
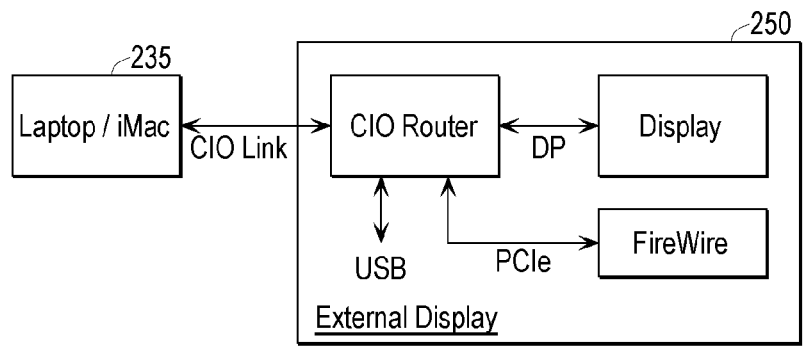
FIG. 12C is a block diagram of a computer system showing how a CIO router in a computer can be used to communicate with a CIO router in an external display.

FIGS. 12A through 12C are block diagrams showing how a CIO router can be built into a computer 235 and used to communicate with CIO routers in other devices. The computer, which can be, for example, a laptop or an iMac®, includes a CPU, memory, a built-in display, and various interfaces and I/O controllers. The interfaces, for some architectures such as those based on an Intel CPU, include a memory controller hub ("MCH"), often referred to as the North Bridge, and an I/O controller hub ("ICH"), often referred to as the South Bridge.

In accordance with established practice, the North Bridge provides the CPU with interfaces to main memory and a graphics processing unit ("GPU"). In the case of a laptop computer, the GPU can be an internal GPU (i.e., integrated with the system logic chipset, say with the North Bridge chip); otherwise it can be a separate unit that communicates via a suitable signaling protocol such as PCIe Graphics ("PEG). The South Bridge provides various I/O interfaces, shown here as local I/O and PCIe.

The router, which corresponds to the root router discussed above, has a PCIe port that communicates with the South Bridge, a non-CIO port that communicates with the GPU using a suitable signaling protocol such as DisplayPort, and one or more CIO ports (one is shown in the figure). The CIO router can be implemented as an integrated circuit chip on the computer's motherboard, with an electrical/optical translation module to provide optical signaling at the CIO port.

FIG. 12A shows the CIO router in computer 235 interfaced via a CIO link to the upstream-facing CIO port of another CIO router inside a dock 240 having a display. The dock's router is shown as having three non-CIO downstream-facing ports. A DP port communicates with a display that is in addition to the built-in display in computer 235. A PCIe port communicates with an I/O controller hub that provides USB and SATA interfaces. The third non-CIO port provides a FireWire interface. The manner in which this is implemented is a matter of design choice. As discussed above, if the CIO router has built-in PCIe/FireWire translation circuitry, the port can provide native FireWire signaling and the block labeled "FireWire" can be a FireWire connector. Conversely, if the router does not have PCIe/FireWire translation circuitry, the port can provide PCIe signaling and the block can be a FireWire controller.

FIG. 12B shows the CIO router in computer 235 (shown simply as a single block) interfaced via a CIO link to the upstream-facing CIO port of another CIO router inside a hub 245. The hub's router is shown as having a downstream-facing CIO port and a downstream-facing PCIe port. The PCIe port communicates with an Ethernet controller, while the downstream-facing CIO port communicates with the upstream-facing CIO port in the router in dock 240 with a display (shown simply as a single block).

FIG. 12C shows the CIO router in computer 235 (shown simply as a single block) interfaced via a CIO link to the upstream-facing CIO port of another CIO router inside an external display 250. The display's router is shown as having three non-CIO downstream-facing ports. A DP port communicates with the display. A PCIe port communicates with a FireWire controller or connector as in dock 240. The third non-CIO port is a USB port.

It will be appreciated that a compact port extender can be based on the architecture of dock 240 of FIG. 12A (sans display), or hub 255 of FIG. 12B. For example, a FireWire dongle with a CIO plug at one end a FireWire socket at the other would be a viable device that exploited the use of CIO.

While the above is a complete description of specific embodiments of the invention, the above description should not be taken as limiting the scope of the invention as defined by the claims.

What is claimed is:

1. An apparatus configured to provide packet-switched communication according to a converged I/O (CIO) format in which multiple native I/O formats are encapsulated into a PCIe Vendor Defined Message for transport over a single physical medium, wherein the Vendor Defined Message comprises a specific message format, the apparatus comprising:
   a CIO port configured to transmit packets in the CIO format to another apparatus external to the apparatus via an optical link;
   a non-CIO port configured to receive signals in a non-CIO format that is distinct from the CIO format;
   a first adapter including a first adapter port communicatively coupled with the non-CIO port and a second adapter port communicatively coupled with a switch fabric, wherein the first adapter is configured to receive a signal in the non-CIO format via the first adapter port, encapsulate the signal into a packet in the CIO format and output the packet via the second adapter port;
   a second adapter including a third adapter port communicatively coupled with the switch fabric and a fourth adapter port communicatively coupled with the CIO port, wherein the second adapter is configured to receive the packet output by the first adapter via the third adapter port and output the packet via the fourth adapter port to the CIO port for transmission to the another apparatus; and
   a time management unit that is configured to exchange synchronization packets with an upstream device.

2. The apparatus of claim 1 wherein the CIO format uses a credit-based flow control.

3. The apparatus of claim 1 wherein the time management unit provides updates at intervals on the order of or shorter than 100 µs.

4. The apparatus of claim 1 wherein the time management unit provides updates at intervals on the order of or shorter than 10 µs.

5. The apparatus of claim 1 wherein the time management unit provides time, frequency, and phase synchronization.

6. The apparatus of claim 1 wherein the CIO format is PCIe.

7. The apparatus of claim 6 wherein the non-CIO format is DisplayPort.

8. The apparatus of claim 1 wherein the second adapter is further configured to: receive a second packet in the CIO format via the fourth adapter port; and output the second packet via the third adapter port; and
wherein the first adapter is further configured to: receive the second packet via the second adapter port; extract a signal in non-CIO format from the second packet; and output the signal in non-CIO format via the first adapter port.

9. The apparatus of claim 1 further comprising an electrical/optical translation unit that is communicatively coupled with the fourth adapter port of the second adapter, wherein the electrical/optical translation unit is configured to convert the packet from an electrical signal to an optical signal prior to transmitting the packet to the another apparatus.

10. A method performed by a first apparatus including a converged I/O (CIO) port configured to transmit packets in a CIO format in which multiple native I/O formats are encapsulated into a PCIe Vendor Defined Message comprising a specific message format for transport over a single physical medium to a second apparatus external to the first apparatus, a non-CIO port configured to receive signals in a non-CIO format that is distinct from CIO format, a first adapter port communicatively coupled with the non-CIO port, a second adapter port communicatively coupled with a switch fabric, a third adapter port communicatively coupled with the switch fabric, and a fourth adapter port communicatively coupled with the CIO port, the method comprising:
receiving, by first apparatus, a signal in the non-CIO format via the first adapter port;
encapsulating, by the first apparatus, the signal into a packet in the CIO format; outputting, by the first apparatus, the packet via the second adapter port;
receiving, by the first apparatus, the packet output by the first adapter via the third adapter port; and
outputting, by the first apparatus, the packet via the fourth adapter port to the CIO port for transmission to the second apparatus external to the first apparatus.

11. A router comprising: a plurality of converged input/output ports configured to transmit packets in a converged I/O (CIO) format in which multiple native I/O formats are encapsulated into a PCIe Vendor Defined Message for transport over a single physical medium, wherein the Vendor Defined Message comprises a specific message format;
a plurality of converged input/output adapters, each converged input/output adapter being coupled to a respective converged input/output port and being configured to receive a signal in a non-CIO format, encapsulate the signal into a packet in the CIO format, and output the packet;
a processing component coupled to the plurality of converged input/output adapters and configured to:
maintain a local time base characterized by a value, a frequency, and a phase;
receive a representation of a time base from an upstream router;
generate and send synchronization messages at regular intervals to the upstream router, each synchronization message including a sequence of timestamped packets;
receive a second sequence of timestamped packets from the upstream router in response to each synchronization message; and
use timestamp information and time base information to synchronize the local time base's value, frequency, and phase with a value, frequency, and phase extracted from the second sequence of timestamped packets;
wherein the plurality of converged input/output adapters includes a set of configuration registers that face downstream of the router, and the processing component is configured to use the configuration registers to synchronize the local time base with a downstream router connected to one of the plurality of converged input/output ports.

12. The router set forth in claim 11 wherein the processing component determines a latency based on timing information in the first and second sequences of timestamped packets to correct the received time base for transit time.

13. The router set forth in claim 11 wherein the processing component sends the first sequence of timestamped packets using PCIe vendor defined messages.

14. The router set forth in claim 11 wherein the processing component sends the first sequence of timestamped packets over an optical link.

15. The router set forth in claim 11 wherein at least some of the converged input/output ports are optical ports and wherein the router further comprises interface circuitry associated with each optical port including one or more electro/optical elements that converts electrical signals from the router to optical signals for output on the converged input/output port and converts optical signals received at the converged input/output port to electrical signals for use by the router.

16. The router set forth in claim 11 further comprising at least one non-converged input/output port and circuitry adapted to encapsulate native (non-PCIe) I/O formats within PCIe packets.

17. The router set forth in claim 11 further comprising a PCIe adapter coupled to input/output adapters via a bus, to support communication using a peripheral component interconnect express (PCIe) serial-based protocol.

18. The router set forth in claim 11 wherein the processing component generates and sends synchronization messages at intervals on the order of 10 microseconds.

19. The router set forth in claim 11 wherein the synchronization messages are encapsulated within PCIe vendor defined messages.

20. A router comprising:
a plurality of converged input/output ports;
a plurality of converged input/output adapters, each converged input/output adapter being coupled to a respective converged input/output port;
a processing component coupled to the plurality of converged input/output adapters and configured to:
maintain a local time base characterized by a value, a frequency, and a phase;
receive a representation of a time base from an upstream router;
generate and send synchronization messages at regular intervals to the upstream router, each synchronization message including a sequence of time stamped packets;
receive a second sequence of time stamped packets from the upstream router in response to each synchronization message; and
use time stamp information and time base information to synchronize the local time base's value, frequency, and phase with a value, frequency, and phase extracted from the second sequence of time stamped packets;
wherein the plurality of converged input/output adapters includes a set of configuration registers that face downstream of the router, and the processing component is configured to use the configuration registers to synchronize the local time base with a downstream router connected to one of the plurality of converged input/output ports; and wherein the processing component comprises:

signal processing circuitry associated with each converged input/output port;

a signal processing unit coupled to the signal processing circuitry, the signal processing unit configured to perform time base control actions including sample filtering and averaging, determining slew limits, and trim loop dynamics;

a reference oscillator;

a count register; and a time base synthesis circuit coupled to the signal processing unit, reference oscillator and count register, the time base synthesis circuit configured to drive a count in the count register from which a synchronized time is derived.

* * * * *